Figure 1:
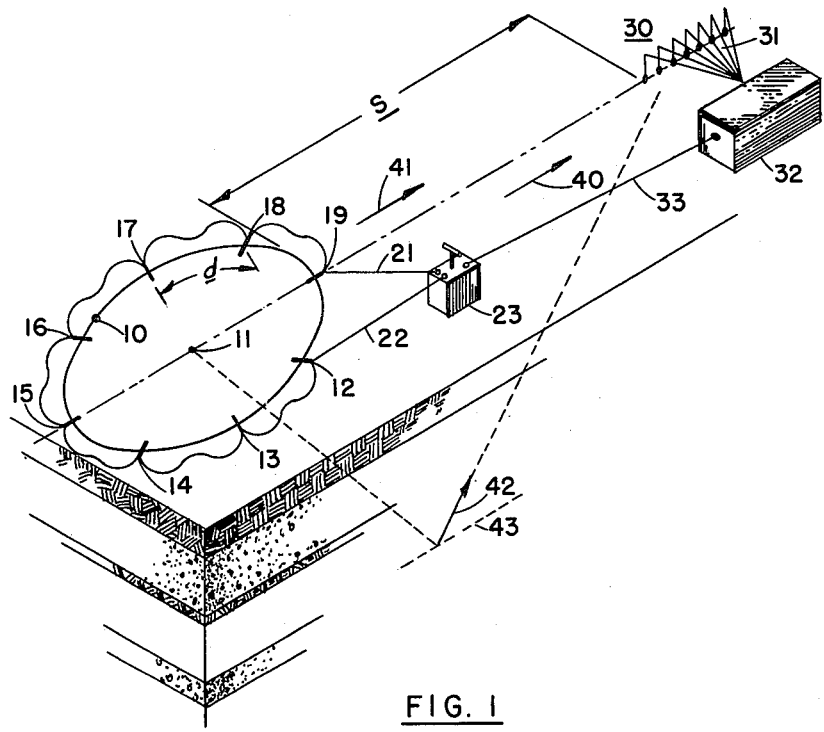

RANDOLPH F. SIMON
STANLEY N. HEAPS
INVENTORS

BY Sidney A. Johnson

ATTORNEY

Patented Feb. 19, 1952

2,586,731

UNITED STATES PATENT OFFICE 2,586,731

SURFACE GENERATION OF SEISMIC WAVES

Randolph F. Simon and Stanley N. Heaps, Dallas, Tex., assignors, by mesne assignments, to Socony-Vacuum Oil Company, Incorporated, New York, N. Y., a corporation of New York Application March 11, 1949, Serial No. 80,806

2 Claims. (Cl. 181—.5)

This invention relates to seismic exploration and more particularly to the generation of seismic waves.

Seismic waves are customarily generated by detonation of an explosive charge at a substantial depth in the earth. The charge is usually located in depth at least below the base of the surface weathered layer. Detonation of the explosives at a depth in the earth is advantageous because wave energy in its downward travel is not lost or reflected at the base of the weathering. Additionally, many hazards encountered in handling and shooting explosive charges are minimized by loading and detonating in the earth. Such procedures, however, require bore holes drilled to the desired depths. In some areas it has been found necessary to detonate the charges below 200 feet. This has been found to be the case particularly in areas having hard rock formations of appreciable thickness at or near the surface. Drilling such deep holes is very expensive and is to be avoided if possible.

A further disadvantage of the foregoing method of shooting will be apparent from the following consideration. Energy released upon detonation of the charge is applied to a relatively small volume of earth surrounding the charge. The application of a high force to the strata may, and usually does, exceed the elastic limit of the adjacent formation out to an appreciable distance away from the charge. A portion of the wave energy is thus dissipated. Additionally, the shot impulse is modified thereby so that the wave later detected is no longer a simple function, but rather is complex and difficult to analyze. Further, repeated shots at a given location in a shot hole or in the same formation in different shot holes will not, as a general rule, produce impulses of the same character.

In eliminating the foregoing disadvantages and in accordance with the present invention, a flexible elongate explosive charge is positioned on the earth's surface, preferably symmetrically to a shot point. The elongate charge is detonated to apply to the earth's surface a relatively small force distributed over a substantial area to generate seismic waves. In one form, a plurality of detonators or caps are located along the elongate charge at intervals so that the whole charge will be detonated within a predetermined time interval, preferably not more than the minimum readable time interval on the record produced by the instruments used to record the waves thus generated. By distributing the force over a large area, a relatively simple impulse is generated having sufficient energy to travel to subsurface reflecting beds and be identified when reflected to the surface. At points spaced from the elongate charge, the reflected waves are recorded intermediate the arrival of refracted waves and air waves.

Figure 2:
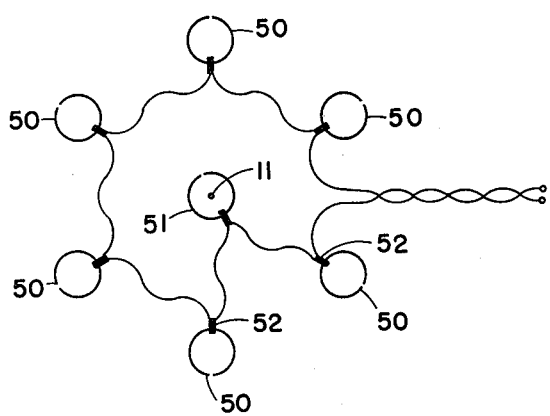

For a more detailed explanation of the invention and for further objects and advantages thereof, reference may now be had to the following description taken in conjunction with the accompanying drawings in which:

Fig. 1 is an isometric view of an exploration system utilizing charges in accordance with the present invention, and Fig. 2 illustrates a plan view of a modified form of charge configuration.

The fundamental problem in generating seismic waves for determining the depths of reflecting interfaces is to produce waves of sufficient energy and distinctive character as to be detected and recognized at seismic detecting stations. It has been found that an elongate charge may be positioned on the earth's surface and detonated in the manner herein described to produce impulses of the desired characteristics.

Referring to Fig. 1, there is illustrated a flexible elongate explosive charge 10 positioned along the periphery of a circle whose center is at shot location 11. The charge may consist of a high explosive in the form of a flexible fabric sheath enclosing a uniformly distributed filler or pencil of explosive compound. A plurality of detectors or blasting caps are positioned along the length of the charge. As illustrated in Fig. 1, caps 12—19 are located at regular intervals about the periphery of the circularly shaped elongate charge 10. The distance $d$ between each of the caps 12—19 will be determined in a preferred manner later to be described. The caps are connected in series and, by way of leads 21 and 22, to a suitable blasting mechanism represented by the blaster 23. A plurality of geophones, seven of which are shown forming a spread 30, are positioned along a line passing through the shot point 11. The geophones 30 are connected by way of cables 31 to amplifying-recording apparatus generically represented by the box 32. A communication cable 33 is connected between the blaster 23 and the recording unit 32 to provide, along with additional auxiliary equipment not shown, the necessary coordination between personnel at shot point and detecting locations.

Since the caps 12—19 are series connected, actuation of the blaster 23 initiates detonation of the charge 10 simultaneously at the location of each of the caps. The detonation wave proceeds in both directions from each cap until the whole charge has been expended. Detonation of the charge generates three general classes of waves which are of specific importance from seismic considerations. A first wave is generated which travels through the air at the velocity of sound. A second wave, refracted in near surface formations, travels along shallow, high velocity beds. Waves of a third group, those which must be used for seismic reflection studies, travel substantially vertically into the earth and are reflected from sub-surface interfaces back to the surface where they are detected.

Waves of the second group, the refracted waves, represented by the arrow 40, Fig. 1, reach the spread 30 first and are generally recorded as the "first breaks" on seismic records. Because of their early arrival, they do not interfere with the recording of later arriving reflections. There may, however, be interference between the first group, the air waves illustrated as arrow 41, and the reflected waves generically represented by arrow 42 reflected from a sub-surface interface 43. To avoid interference, and to record reflections intermediate the arrival of the refracted waves and the air waves, the spacing S between the first geophone of spread 30 and the nearest segment of the charge 10 must be such that the reflected wave 42 may travel to the deepest bed of interest and back to the surface (at a relatively high velocity, for example 6,000–12,000 feet per second), before the air wave 41 travelling at approximately 1,100 feet per second reaches the spread 30. To illustrate, if the distance S is greater than 1,100 feet, the velocity of the air wave 41 is assumed to be 1,100 feet per second and the average velocity of the sub-surface strata is 9,000 feet per second, reflections from horizons as deep as 4,500 feet may be recorded without interference from the air wave 41.

The detected waves are recorded as undulating lines on a photographic strip or chart in the usual manner. The lines are galvanometer traces and correspond with ground movement or some function thereof at the location of associated detector units. A time scale is also photographically impressed on the record chart to provide a time base for computing depths of underlying formations. The timing marks forming such scale are ordinarily placed upon the record at .01 second intervals. In practice, computers are able accurately to interpolate record times to a minimum record interval of .001 second. This will be appreciated when it is considered that within the frequency range of the seismic waves (30–80 C. P. S.) and at the amplitude usually permitted on multi-trace records (1 inch average) the time occurrence of a trace maximum or a minimum cannot accurately be determined to less than .001 second. Thus, there is introduced a probable error merely in reading record times. An additional error which must be considered is introduced by variations in the character of the explosion which results in variations in the frequency of the seismic waves themselves. This variation is minimized using elongate charges since the energy is applied to an area of the earth large compared with the area directly affected using a buried charge. Even so variations in individual plant of successive elongate charges cause minor variations in the impulse frequency. In seismic amplifiers using sharply selective filtering systems for the elimination of unwanted bandpass signals, the reflected signals may differ in their frequency as to be delayed up to .001 second from shot to shot. Accordingly, a minimum readable record time of .002 second, the maximum time-resolution of the record, is the sum of the aforementioned errors and determines the ultimate or overall accuracy of the seismic calculations.

It has been found preferable to insure complete detonation of the entire charge within a period not greater than the minimum readable record time. This consideration is important because of the fact that the charge has a finite detonation velocity. Accordingly, all portions of the charge are not more than a distance $x$ from a cap, the distance $x$ being defined as:

$$x = vt$$

where $v$ = detonation velocity (feet per second), and
$t$ = minimum readable record time (seconds).

A suitable explosive for use in the prospecting method above described is pentaerythriton tetranitrate, $C_5H_8O_2N_4$, which may be made in the form of a high velocity fuse having a flexible waterproof covering. A commercial form of this explosive, known as Primacord, contains approximately 3 grams of explosive per foot and has a velocity of detonation of approximately 20,000 feet per second. Since, in present practice the time $t = .002$ second, all portions of the above explosive are preferably not more than $(x = vt)$ 40' from a detonator or cap. For the usual recording systems where $t = .002$ the equation may be expressed $$x = \frac{v}{500}$$

In the system illustrated in Fig. 1, the eight caps, 12–19, are spaced along the circular charge 10. Since detonation proceeds in both directions from each of the blasting caps the distance $d$ between adjacent caps may be as great as 80 feet. Accordingly, the diameter of the circular configuration of Fig. 1 using eight detonators may be slightly greater than 200 feet.

The invention is not limited to the particular charge configuration illustrated in Fig. 1 or the detonator spacing above-noted. In preferred practice the spread configuration is symmetrical with respect to a point of known or measurable elevation. This is for the purpose of simplifying calculation and interpretation of the records. However, other configurations in which the energy from detonation of the charge is applied over a substantial area of the earth may be used. For example, in Fig. 2 a modified charge configuration wherein 7 lengths of elongate charge oriented in the form of loops in symmetrical array with respect to the shot point 11 is illustrated. More particularly, six lengths of explosive or charge segments 50 are positioned at regular intervals in circular configuration. A loop 51 is positioned at the center of the configuration. Detonating caps 52 are fastened to the loops midway between the ends. The loops are 80 feet in circumference. It will be apparent that other configurations might be utilized. For example, a plurality of rays of charge emanating from a central point or several such points could be utilized.

While in present seismograph practice the preferred detonation time is not greater than .002 second it is to be noted that other systems using higher frequencies than the 30–80 cycle band width may permit greater resolving power, thus higher camera speeds which would dictate the preferred practice of detonating the elongate charge within a correspondingly shorter time interval.

The term "elongate charge" used herein to describe the type of explosive used in the present invention is to be distinguished from sticks of dynamite. The term is to be taken to mean rope-like explosive charges which may be handled and oriented without self-resistance and which may be distributed so as to substantially encircle areas of the earth's surface.

The term "minimum readable record time" above-noted and used in the following claims shall be taken to mean a time interval equal to the probable error in the readings of seismograph records for a given set of detecting-recording instruments. As above noted, this time interval depends in part upon the amplitude of the traces and the speed of the recording paper or chart.

Though certain modifications of the invention have been illustrated and described, it is to be understood that further modifications within the scope of the appended claims may now suggest themselves to those skilled in the art.

We claim:

1. A seismic exploring system which comprises a plurality of detectors located at receiving stations and responsive to earth vibrations for producing electrical signals in the seismic frequency range of from 30 to 80 cycles per second, a seismic recorder connected to said detectors and including a record chart and means for driving said record chart past a recording point at a preselected speed to record said signals as undulations in side by side relation along the length of said chart thereby to produce a timed record on which the time-occurrence of a seismic event, because of the relation between the frequency range of said seismic signals and said speed, is capable of being read to within a minimum time interval which interval corresponds with the maximum time-resolution of said record, and means for producing surface generated seismic waves while maintaining said maximum time-resolution which includes an elongated explosive charge in substantial contact along its length with the earth's surface at a sending station spaced from said receiving stations and characterized by a ratio of length to velocity of detonation greater than said minimum time interval, a plurality of detonators positioned in firing relation to said elongated charge at points spaced along said charge at intervals not greater than twice the product of said velocity and said minimum record interval, and means for simultaneously energizing said detonators completely to expend said charge within said minimum time interval.

2. A seismic exploring system which comprises a plurality of detectors located at receiving stations and responsive to earth vibrations for producing electrical signals in the seismic frequency range of from 30 to 80 cycles per second, a seismic recorder connected to said detectors and including a record chart and means for driving said record chart past a recording point at a speed of approximately 15 inches per second to record said signals as undulations in side by side relation along the length of said chart thereby to produce a timed record on which the time-occurrence of a seismic event, because of the relation between the frequency range of said seismic signals and said speed is capable of being read to within a minimum time interval of approximately .002 second which interval is the maximum time-resolution of said record, and means for producing surface generated seismic waves while maintaining said maximum time-resolution which includes a continuous elongated explosive charge in substantial contact along its length with the earth's surface at a sending station spaced from said receiving stations and characterized by a ratio of length to velocity of detonation greater than said .002 second, a plurality of detonators positioned in firing relation to said elongated charge at points spaced along said charge at intervals not greater than twice the product of said velocity and said minimum record interval, and means for simultaneously energizing said detonators completely to expend said charge within a .002 second interval.

RANDOLPH F. SIMON.
STANLEY N. HEAPS.

REFERENCES CITED

The following references are of record in the file of this patent:

UNITED STATES PATENTS

| Number | Name | Date |
| --- | --- | --- |
| 1,899,970 | McCollum | Mar. 7, 1933 |
| 2,064,451 | Voorhees | Dec. 15, 1936 |
| 2,133,484 | Sherar | Oct. 18, 1938 |
| 2,340,314 | Farnham | Feb. 1, 1944 |